(12) United States Patent
Hayashi et al.

(10) Patent No.: US 6,381,041 B1
(45) Date of Patent: Apr. 30, 2002

(54) IMAGE PROCESSING HAVING INERTIA WEIGHT FOR A ROTARY SHAFT

(75) Inventors: Eiichi Hayashi; Yuichi Kawanabe, both of Ohmiya (JP)

(73) Assignee: Fuji Photo Optical Co., Ltd., JPX ( * ) Notice: Subject to any disclaimer, the term of this patent is extended or adjusted under 35 U.S.C. 154(b) by 0 days.

(21) Appl. No.: 09/675,034

(22) Filed: Sep. 28, 2000

(30) Foreign Application Priority Data

Sep. 29, 1999 (JP) .......................................... 11-275843

(51) Int. Cl.⁷ ................................................ H04N 1/04
(52) U.S. Cl. ........................................ 358/474; 464/180
(58) Field of Search ............................... 464/180, 901; 188/378; 74/573 R, 572; 24/279, 280, 281, 282; 358/474

(56) References Cited

U.S. PATENT DOCUMENTS

| | | | | |
|---|---|---|---|---|
| 863,887 A | * | 8/1907 | Stuttle | 285/420 X |
| 3,074,293 A | * | 1/1963 | Langsetmo | 464/180 X |
| 3,163,117 A | * | 12/1964 | Haentjens | 74/573 R X |
| 3,172,502 A | * | 3/1965 | Wells | 188/378 |
| 3,664,228 A | * | 5/1972 | Hasz | 464/180 X |
| 4,196,786 A | * | 4/1980 | Hornig et al. | 188/378 X |
| 6,067,174 A | | 5/2000 | Hayashi | |
| 6,091,517 A | | 7/2000 | Hayashi | |
| 6,108,505 A | | 8/2000 | Hayashi | |
| 6,144,465 A | * | 11/2000 | Hayashi | |
| 6,220,106 B1 | * | 4/2001 | Hayashi | |

OTHER PUBLICATIONS

U.S. Application No. 09/310,437 entitled Driving Shaft Construction in an Image Processor.

* cited by examiner

*Primary Examiner*—Lynne H. Browne
*Assistant Examiner*—Greg Binda
(74) *Attorney, Agent, or Firm*—Price, Heneveld, Cooper, DeWitt & Litton

(57) ABSTRACT

An image processor includes an inertia weight for a rotary shaft, which can be added or replaced without removing the rotary shaft from its supporting section by arranging the inertia weight mounted on the rotary shaft so as to stabilize the rotation of the rotary shaft. The vertical weight is formed by splitting a member having an almost cylindrical shape along a plane including the longitudinal axis. A through-hole and a female threaded aperture are formed in joining faces of the split member. The pair of the weight parts can be added and detached from the driving shaft by a securing screw extended into the through-hole and threaded aperture.

9 Claims, 5 Drawing Sheets

IMAGE PROCESSING HAVING INERTIA WEIGHT FOR A ROTARY SHAFT

BACKGROUND OF THE INVENTION

1. Field of the Invention

The present invention relates to an inertia weight which is attached to a rotary shaft for use in various apparatuses so as to achieve smooth and stable rotation of the rotary shaft, and more particularly relates to an inertia weight suitable for a driving shaft used for performing scanning by an image processor having a scanning function, such as a copying machine, a facsimile machine and a scanner.

2. Description of the Related Art

In the image processor of stationary original type, scanning for obtaining image information is performed line by line by moving a light source lamp with respect to an original placed on platen glass. A drive mechanism for moving this light source lamp uses a mechanism in which a pulley attached to a rotating driving shaft is linked with a full-rate carriage that carries the light source lamp and moves across the entire area of the original and the carriage is moved by the movement of the pulley. Besides, reflected light resulting from irradiating the original by the light source lamp needs to be guided to photoelectric converter such as a CCD (charge coupled device), and also the length of an optical path from the original to the photoelectric conversion device needs to be substantially uniform irrespective of the movement of the carriage. Therefore, in addition to the full-rate carriage, the image processor includes a half-rate carriage, which moves a half of the amount of movement of the full-rate carriage in synchronization with the full-rate carriage. Moreover, the full-rate carriage is provided with a first reflector, while the half-rate carriage is provided with a second reflector and a third reflector so that the reflected light from the original is reflected in suitable directions by the first, second and third reflectors to be guided to the photoelectric conversion device.

As described above, in the image processor, the full-rate carriage and half-rate carriage must perform accurate scanning. In order to achieve this, they are required to move in a stable manner at a constant rate. Therefore, an inertia weight is attached to the driving shaft to stabilize the rotation of the driving shaft.

The above-mentioned conventional inertia weight for a rotary shaft, however, is formed in a cylindrical or ring shape, and the driving shaft is inserted into the inertia weight when attaching the inertia weight to the driving shaft. Hence, for example, in the event of adding the inertia weight to the driving shaft or replacing it with another inertial weight, parts such as the above-mentioned drive pulley linked with the driving shaft must be detached and the driving shaft must be removed from the casing of the image processor to add or replace the inertial weight. Consequently, the operation of adding or replacing the inertia weight is complicated.

Therefore, it is an object of the present invention to provide an inertia weight for a rotary shaft, capable of being added or replaced without removing a driving shaft.

SUMMARY OF THE INVENTION

As technical means for achieving the above object, an image processor has an inertia weight for a rotary shaft according to a first aspect of the present invention, which is an inertia weight for a rotary shaft attached to the rotary shaft so as to stabilize the rotation of the rotary shaft, is characterized by comprising weight parts formed by cutting a member having an almost cylindrical shape along a plane including an axis thereof so as to freely assemble and disassemble the weight parts into and from the member having the original cylindrical shape.

In the event of adding the inertia weight, the weight parts prepared by disassembling the inertia weight in advance are attached to the rotary shaft and assembled as the inertia weight. Moreover, the assembled weight parts are fastened together or fastened to the rotary shaft with suitable securing means so as to prevent accidental disassembly. As the securing means, for example, it is possible to employ a configuration in which one of the joining faces of the weight parts positioned to face each other is provided with a female screw section, the other is provided with a through-hole, and a fixing screw is inserted into the through-hole and screwed into the female screw section so as to fasten the weight parts together.

Moreover, an inertia weight for a rotary shaft according to a second aspect of the present invention is characterized in that the rotary shaft is a driving shaft for providing a driving force for moving a light source lamp of an image processor that reads information of an image formed on a original by scanning the original while sequentially changing an irradiation position by moving the light source lamp with respect to the original.

In the image processor, the driving shaft needs to be rotated at a constant rate so as to stabilize the movement of a carriage for scanning the original, and, therefore, an inertia weight is attached to the driving shaft. Moreover, there is an occasion that the scanning condition is set by adjusting the inertia force of the inertia weight and, for this setting, the inertia weight is added or replaced, if necessary. For example, in the event of replacing the inertia weight, only by disassembling the inertia weight mounted on the driving shaft, it is possible to detach the inertia weight without removing the driving shaft. Then, the weight parts of a new inertia weight are assembled on the driving shaft and fastened together or fastened to the driving shaft with securing means or the like. Furthermore, in the event of adding an inertia weight, new weight parts are assembled on the driving shaft and fastened with the securing means or the like.

Besides an inertia weight for a rotary shaft, according to a third aspect of the present invention, an inertia weight for a rotary shaft is characterized in that the inertia weight is split into two parts. Although the number of parts into which the inertia weight is split may be changed suitably, the inertia weight is split into two parts for easy processing and simple assembling.

The nature, principle, and utility of the invention will become more apparent from the following detailed description when read in conjunction with the accompanying drawings in which like parts are designated by like reference numerals or characters.

DETAILED DESCRIPTION OF THE EMBODIMENT

Figure 5:
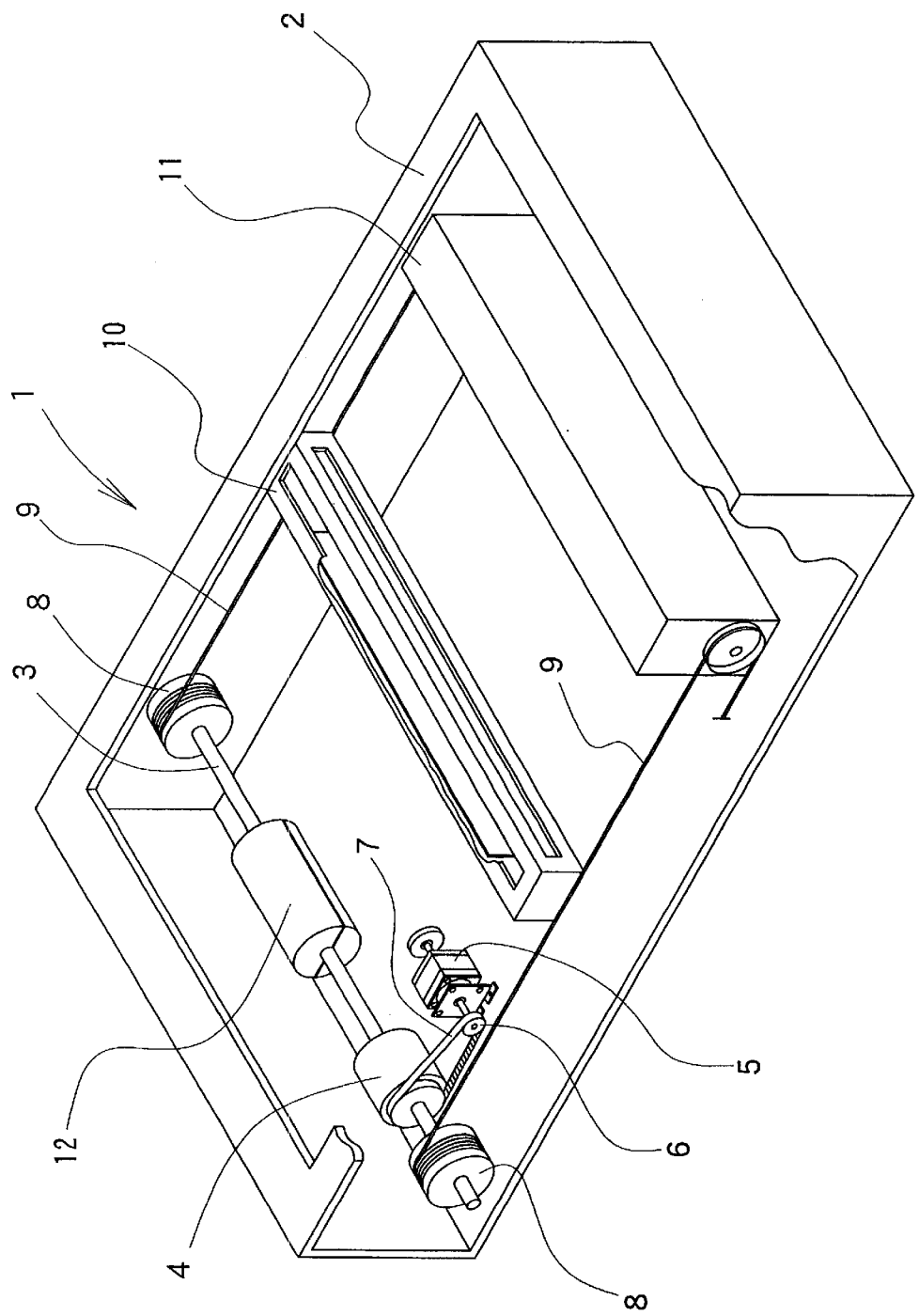
FIG. 5 is a partially cutaway perspective view showing schematically a drive mechanism of an image processor incorporating an inertia weight for a rotary shaft according to the present invention.

Referring to an illustrated preferred embodiment, the following description will specifically explain an inertia weight for a rotary shaft according to the present invention. In this embodiment, a driving shaft for use in an image processor is explained as an example of a rotary shaft. FIG. 5 is a schematic perspective view explaining a drive mechanism of this image processor 1. A driving shaft 3 is supported at one of the end sections of a casing 2 so that it can rotate freely. A driving belt 7 is stretched over a driven pulley 4 attached to the driving shaft 3 and a driving pulley 6 attached to an output axis of a motor 5, so that an output rotation of the motor 5 is transmitted to the driving shaft 3. A driving pulley 8 is attached to each end of the driving shaft 3. A wire 9 is wound around the driving pulley 8. This wire 9 is stretched in a suitable way, and linked with a full-rate carriage 10 carrying a light source lamp and a half-rate carriage 11. The direction in which the wire 9 is reeled on the driving pulley 8 varies in response to a rotating direction of the driving shaft 3. By changing this direction, the full-rate carriage 10 and half-rate carriage 11 move in forward and backward directions.

Moreover, a first reflector (not shown) is attached to the full-rate carriage 10, while second and third reflectors (not shown) are attached to the half-rate carriage 11. Furthermore, an imaging lens and photoelectric converter such as a CCD (charge coupled device), not shown, are mounted on a base plate of the casing 2. Besides, platen glass (not shown) for placing an original thereon is attached to an upper part of the casing 2, and the original is irradiated with the light source lamp. The light reflected by the original is reflected sequentially by the first, second and third reflectors, passes through the imaging lens, and incident on the photoelectric conversion device. At this time, the full-rate carriage 10 is arranged to move across the entire area of the platen glass so as to enable scanning of a original of a maximum size, while the half-rate carriage 11 is arranged to move an almost half of the amount of movement of the full-rate carriage 10 in synchronization with the full-rate carriage 10. With these arrangements, the length of an optical path from the original to the photoelectric conversion device is kept substantially uniform even when the full-rate carriage 10 moves.

Figure 1:
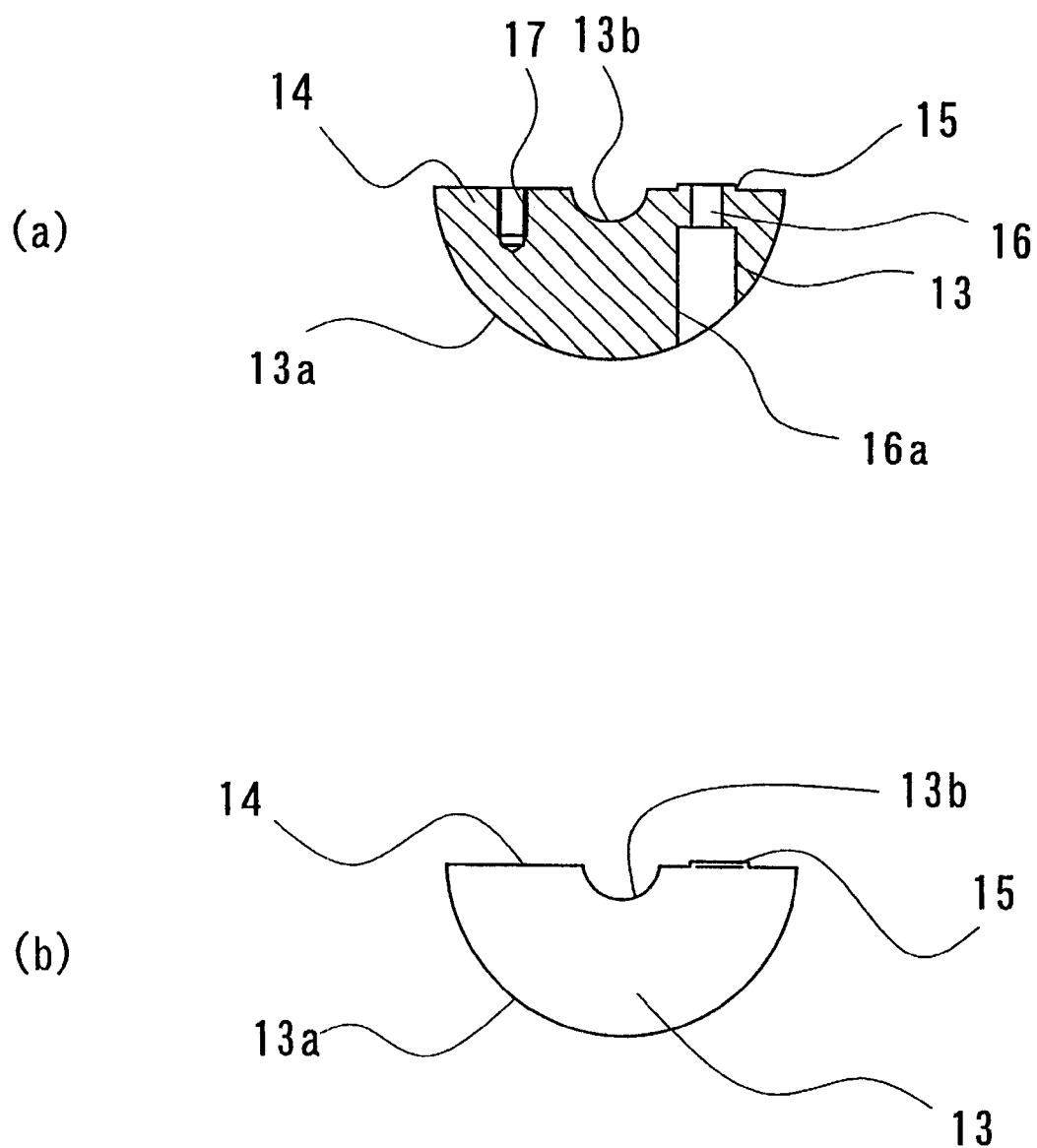
FIGS. 1(*a*) and 1(*b*) are views showing weight parts of an inertia weight for a rotary shaft according to an embodiment of the present invention, wherein FIG. 1(*a*) is a cross section taken along the A—A line in FIG. 2 and FIG. 1(*b*) shows a view seen from the direction of the B—B line in FIG. 2.
Figure 2:
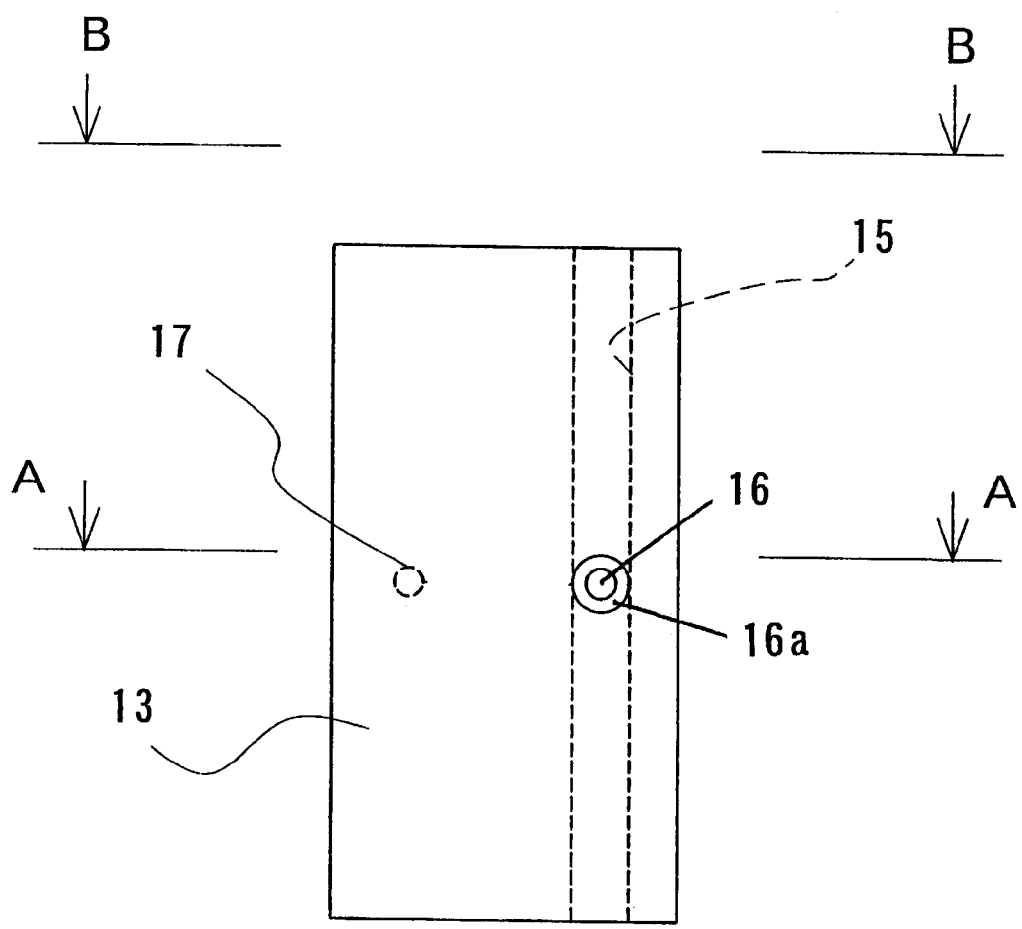
FIG. 2 is a plan view of a weight part of the inertia weight for a rotary shaft according to an embodiment of the present invention.
Figure 3:
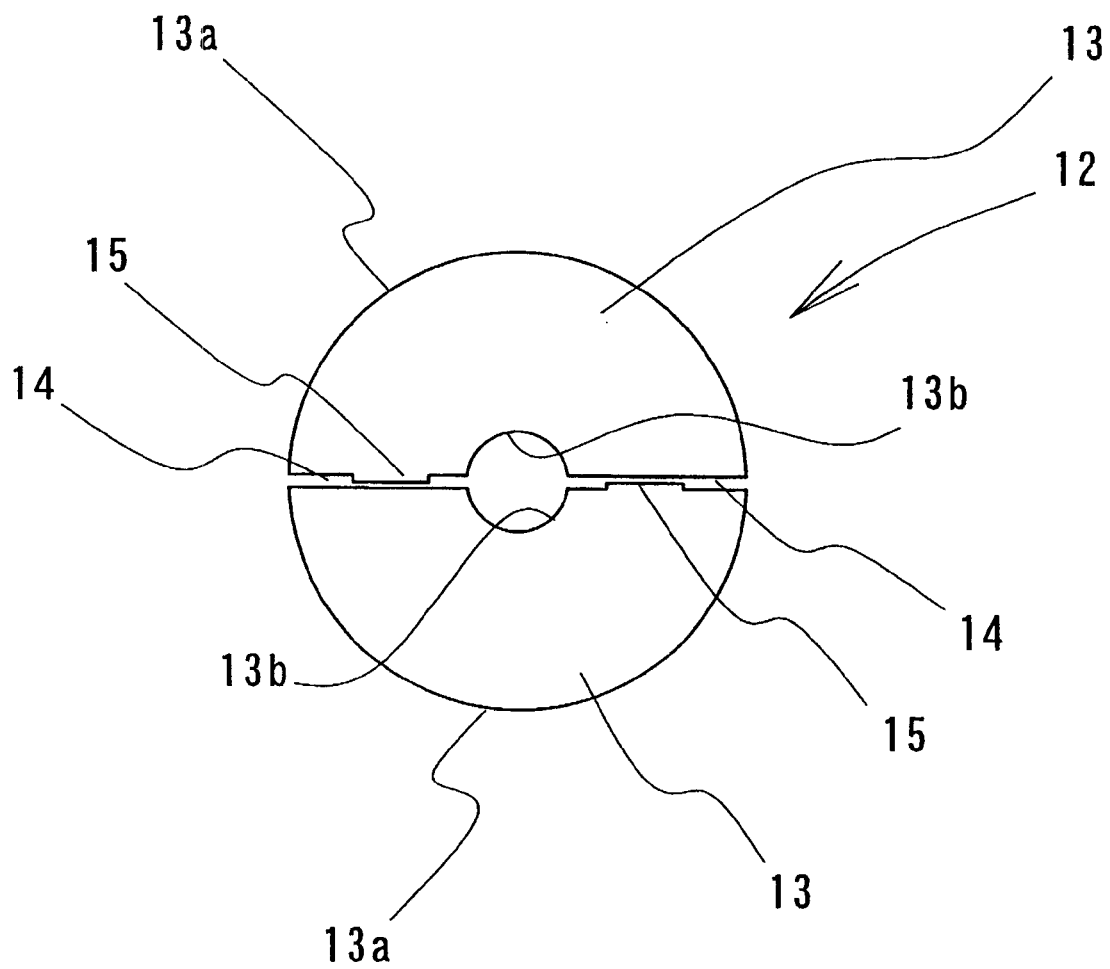
FIG. 3 is a side view of the inertia weight for a rotary shaft according to an embodiment of the present invention.

In addition, an inertia weight 12 is attached to the driving shaft 3 so as to enable the driving shaft 3 to rotate in a stable manner. This inertia weight 12 is formed by joining a pair of weight parts 13 together as shown in FIG. 3. These weight parts 13 are formed by splitting a cylindrical member into two parts along a plane including tie longitudinal axis thereof so that each weight part 13 has a shape possessing a substantially semi-circular outer surface 13a and a substantially semi-circular inner surface 13b as shown in FIGS. 1(a) and 1(b). At a suitable position of a joining face 14 of the weight part 13, as shown in FIGS. 1(a), 1(b) and 2, a slightly raised generally rectangular seating surface 15 is formed to run in a longitudinal direction of the weight part 13.

Moreover, in a state in which the weight parts 13 are joined together with their joining faces 14 facing each other, the driving shaft 3 is inserted into a cylindrical section formed by the inner surfaces 13b. In one embodiment, the overall weight of the inertia weight 12 was about 12 grams. It is to be understood that with different sized image processors, larger or smaller weights can be used.

Figure 4:
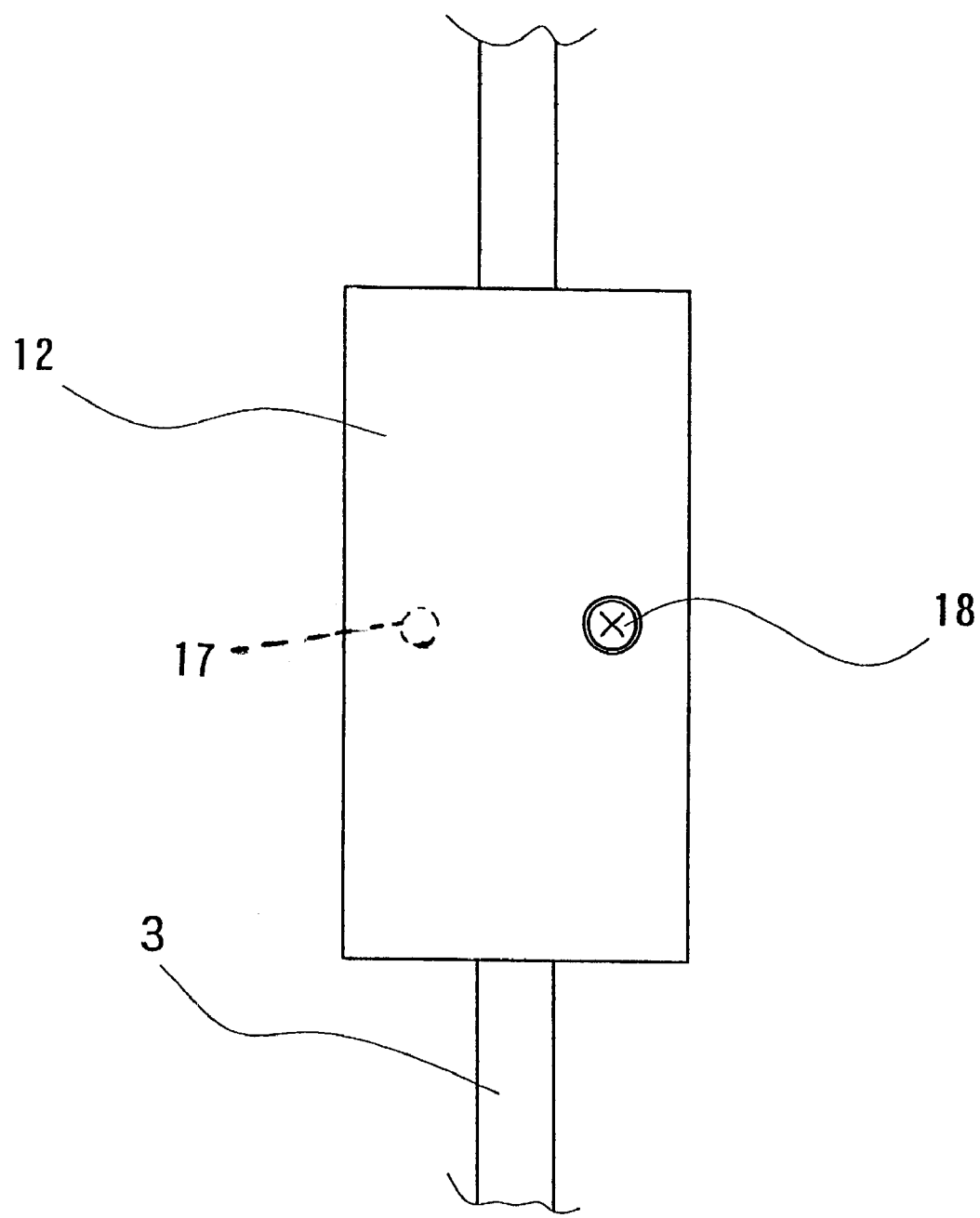
FIG. 4 is a plan view of the inertia weight for a rotary shaft according to an embodiment of the present invention.

As shown in FIG. 1(a), a stepped through-hole 16 is formed to extend from the front surface of the seat section 15 to the outer surface 13a. As shown in FIG. 1(a), this through-hole 16 is provided with a spot facing section 16a formed by enlarging the diameter of the throughhole 16 on the outer surface 13a side to be larger than that on the seat section 15 side. Meanwhile, in a state in which the weight parts 13 are joined together, a portion facing the through-hole 16 is provided with a female threaded section 17. In other words, a securing screw 18 (shown in FIG. 4) that is inserted through the through-hole 16 is screwed into the aligned female threaded section 17, and the head section of the securing screw 18 is accommodated in the spot facing section 16a. Moreover, the surface of the seat section 15 and a portion of the joining face 14 that faces the seat section 15 when the weight parts 13 are joined together are formed to have a predetermined degree of flatness. Incidentally, other portions of the joining face 14 may have a rough surface. Besides, although this embodiment illustrates an example in which each of the through-holes 16 and female threaded sections 17 are provided at aligned positions on opposite sides of shaft 3, it is possible to provide additional fasteners at two or more longitudinally spaced positions in accordance with the length of the weight parts 13.

In order to mount the inertia weight 12 of this embodiment on the driving shaft 3, a pair of the weight parts 13 are mounted so as to hold the driving shaft 3 by their internal surfaces 13b, the securing screw 18 is inserted into the through-hole 16 and screwed tightly into the female screw section 17. As a result, the pair of the weight parts 13 forming a cylindrical member is attached to the driving shaft 3. It is, therefore, possible to readily add the inertia weight 12 without removing the driving shaft 3 from the casing 2.

On the other hand, in order to detach the inertia weight 12 mounted on the driving shaft 3, the securing screw 18 is loosened to disassemble the inertia weight 12 into a pair of the weight parts 13, and then the inertia weight 12 is detached from the driving shaft 3. It is, therefore, possible to readily replace the inertia weight 12.

The embodiment exemplified here illustrates the inertia weight 12 designed to be split into two parts. However, needless to say, the number of parts into which the inertia weight 12 is split is not necessarily limited to two. Moreover, this embodiment illustrates a configuration in which a pair of the weight parts 13 is fastened together with the securing screw 18. However, the configuration is not necessarily limited by the securing screw 18, and any configuration capable of fastening a pair of the weight parts 13 together may be used. Furthermore, it is possible to use a configuration in which each of the weight parts 13 is fastened to the driving shaft 3.

As explained above, according to an inertia weight for a rotary shaft of the present invention, it is possible to attach and detach the inertia weight without removing the rotary shaft from a supporting section thereof. Thus, even after the rotary shaft is installed in an apparatus or the like, it is possible to adjust the inertia force of the rotary shaft.

Furthermore, according to an inertia weight for a rotary shaft according to the second aspect of the present invention, since the inertia weight is used as an inertia weight to be mounted on a driving shaft of an image processor, it is possible to readily perform adjustments for stabilizing the rotation of the driving shaft and certainly obtain the image data of a original.

In addition, according to an inertia weight for a rotary shaft according to the third aspect of the present invention, the number of parts into which the inertia weight is split is minimized by splitting the inertia weight into two parts, and, therefore, the number of components is not increased.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An image processor comprising:
   a casing;
   a rotary shaft rotatably mounted to said casing;
   a carriage having a light source, said carriage coupled to said rotary shaft for scanning an original wherein the improvement comprises an inertia weight for said rotary shaft, which is attached to said rotary shaft so as to stabilize rotation of the rotary shaft, said inertia weight comprising weight parts formed by cutting a member having a substantially cylindrical shape along a plane including a longitudinal axis thereof, and fasteners for joining the weight parts which are freely assembled into and disassembled from the member having the original cylindrical shape around said rotary shaft to facilitate installation and removal from said image processor.

2. The image processor according to claim 1 wherein said rotary shaft is a driving shaft for providing a driving force for moving said light source lamp of said image processor that reads information of an image formed on a original by scanning the original while sequentially changing an irradiation position by moving the light source lamp with respect to the original.

3. The image processor according to claim 2 wherein the inertia weight is longitudinally split into two weight parts.

4. The image processor according to claim 1 wherein the inertia weight is split along said longitudinal axis into two weight parts.

5. The image processor according to claim 1 wherein said weight is about 12 grams.

6. An image processor comprising:
   a casing;
   a carriage movably mounted to said casing and including a lamp for scanning an original;
   a rotary drive shaft coupled to said casing for moving said carriage; and
   an inertia weight for said drive shaft comprising a pair of semicylindrical members, each having an outer wall and an inner semicylindrical bore dimensioned to surround a portion of said drive shaft; fastening apertures positioned to span opposite sides of said drive shaft and including at least one threaded aperture formed in said semicylindrical members for receiving threaded fasteners therein for attachment of said members to said shaft; and wherein said members each include facing surfaces having a longitudinally extending seating surface formed thereon.

7. The image processor according to claim 6 wherein said weight is about 12 grams.

8. An image processor comprising:
   a casing;
   a carriage movably mounted to said casing and including a lamp for scanning an original;
   a rotary drive shaft coupled to said casing for moving said carriage;
   a pair of semicylindrical members, each having an outer semicylindrical wall and an inner semicylindrical bore dimensioned to surround said rotary drive shaft of the image processor;
   a pair of fastening apertures formed in each member including at least one threaded aperture for receiving a threaded fastener for attachment of said members to a drive shaft; and
   wherein said members each include facing surfaces having a longitudinally extending seating surface formed thereon and wherein said seating surface is generally rectangular.

9. The image processor according to claim 8 wherein said semicylindrical members have a combined weight of about 12 grams.

* * * * *

UNITED STATES PATENT AND TRADEMARK OFFICE
CERTIFICATE OF CORRECTION

PATENT NO. : 6,381,041 B1
DATED : April 30, 2002
INVENTOR(S) : Hayashi et al.

It is certified that error appears in the above-identified patent and that said Letters Patent is hereby corrected as shown below:

Title page,
Item [54], "PROCESSING" should be -- PROCESSOR --.
Item [73], Assignee: "JPX" should be -- Japan --.

Column 3,
Line 60, "tie" should be -- the --.

Signed and Sealed this

Fifteenth Day of October, 2002

*Attest:*

JAMES E. ROGAN
*Attesting Officer*     *Director of the United States Patent and Trademark Office*